United States Patent [19]

Langmesser, Jr. et al.

[11] Patent Number: 4,513,937
[45] Date of Patent: Apr. 30, 1985

[54] VERTICAL SEAT ADJUSTER ARRANGEMENT FOR VEHICLE SEATS

[75] Inventors: Otto J. Langmesser, Jr., Fraser; Richard W. A. Rees, West Bloomfield, both of Mich.

[73] Assignee: General Motors Corporation, Detroit, Mich.

[21] Appl. No.: 438,964

[22] Filed: Nov. 3, 1982

[51] Int. Cl.³ .................. F16M 11/24; F16M 13/00
[52] U.S. Cl. .................................. 248/394; 248/396; 248/423; 297/325
[58] Field of Search ............ 248/394, 396, 395, 397, 248/419, 423; 297/325

[56] References Cited

U.S. PATENT DOCUMENTS

| | | | |
|---|---|---|---|
| Re. 25,225 | 8/1962 | Moritz et al. | 248/354 P |
| 2,609,029 | 9/1952 | Haberstump | 155/14 |
| 3,525,496 | 8/1970 | Colutti et al. | 248/394 |
| 3,552,707 | 1/1971 | Tanaka | 248/394 |
| 3,692,271 | 9/1972 | Homier et al. | 248/396 X |
| 3,848,851 | 11/1974 | Elias | 248/354 P X |
| 3,894,708 | 7/1975 | Stanley | 248/394 |
| 4,010,927 | 3/1977 | Pickles | 248/420 |
| 4,190,225 | 2/1980 | Bauer et al. | 248/394 |
| 4,356,990 | 11/1982 | Sakurada et al. | 297/348 X |
| 4,445,661 | 5/1984 | Langmesser, Jr. et al. | 248/396 X |

FOREIGN PATENT DOCUMENTS

| | | | |
|---|---|---|---|
| 2409579 | 9/1975 | Fed. Rep. of Germany | 248/396 |
| 649595 | 11/1962 | Italy | 248/396 |
| 718310 | 2/1980 | U.S.S.R. | 248/394 |

Primary Examiner—J. Franklin Foss
Assistant Examiner—David L. Talbott
Attorney, Agent, or Firm—Herbert Furman

[57] ABSTRACT

A vertical seat adjuster for vehicle seats includes a seat support bracket. The rear portion of the bracket is supported on the vehicle by a lever which is rotatable through a screwjack mechanism to raise and lower the rear portion of the bracket. The front portion of the bracket is likewise supported on the vehicle by a rotatable lever. The front portion of the bracket mounts a pair of lock plates which are movable between engaged and released positions with respect to a detent mounted to the vehicle in order to lock the front portion of the bracket against movement. Each lock plate includes a series of alternating notches and abutments, with the notches and abutments of the locking plates being offset with respect to the other whereby the notch of one lock plate engages the detent to lock the bracket against movement while the abutment of the other engages the detent to maintain the other lock plate in released position. The alternating notches and abutment permits an increased number of adjusted positions of the bracket relative to the vehicle.

3 Claims, 7 Drawing Figures

VERTICAL SEAT ADJUSTER ARRANGEMENT FOR VEHICLE SEATS

This invention relates generally to a vertical seat adjuster arrangement for vehicle seats and more particularly to such an arrangement for selectively manually adjusting the front or rear portion of a vehicle seat.

BACKGROUND OF THE INVENTION

The seat adjuster arrangement of this invention is similar to those shown in Ser. No. 383,471, Vertical Seat Adjuster for Vehicle Seats, Richard W. A. Rees, filed June 1, 1982, and Ser. No. 407,320, Vertical Seat Adjuster Arrangement for Vehicle Seats, Otto J. Langmesser Jr. and Richard W. A. Rees, filed Aug. 12, 1982, both assigned to the assignee of this invention. Both seat adjuster arrangements include inboard and outboard seat adjuster mechanisms of different hand. Each mechanism obtains vertical adjustment of the front or rear portion of the seat through rotation of respective spaced front and rear levers which are pivoted both to a seat support bracket supporting the seat and to a relatively fixed respective vehicle pivotal connection. Conjoint rotation of the front and rear pairs of levers of the inboard and outboard mechanisms about their relatively fixed vehicle pivotal connections is assured by transfer tubes interconnecting the seat support bracket pivots of the levers. Such rotation raises and lowers the respective front and rear portions of the seat and occurs by the seat occupant shifting weight.

In the Rees structure, the seat support bracket of the outboard seat adjuster mechanism slidably mounts a pair of lock plates, each respective to one of the vehicle pivotal connections and having a notched edge engageable with such pivotal connection to lock the corresponding portion of the seat in one of a plurality of vertical positions, the number of positions being equal to the number of notches. The lock plates are selectively and alternately movable to a released position to move the notch thereof out of engagement with a respective vehicle pivotal connection and permit movement of the corresponding portion of the seat and seat support bracket to a new vertical position wherein the notch of the lock plate corresponding to that position is reengaged to lock the seat in the new vertical position.

In the Langmesser and Rees structure, a manually operable screwjack mechanism is coupled to the transfer tube interconnecting the rear levers to rotate such levers and vertically adjust the rear portion of the seat. The screwjack mechanism holds the rear portion of the seat in a vertically adjusted position.

The seat support brackets of the inboard and outboard seat adjuster mechanisms are each provided with a lock plate which is slidably mounted thereon for movement between engaged and released positions relative to a respective front vehicle pivotal connection. Each lock plate includes a series of alternating notches and teeth. The notches and teeth of one lock plate are offset with respect to those of the other lock plate so that each notch of one lock plate corresponds to a tooth of the other lock plate. Thus, when a notch of one lock plate engages a respective pivotal connection, a tooth of the other lock plate abuts a respective pivotal connection whereby one lock plate is always engaged and the other lock plate is always released in each vertically adjusted position of the seat. The seat is locked in each vertically adjusted position since the front levers are coupled together for conjoint rotation by the front transfer tube. The alternating teeth and abutments which are offset with respect to each other provides a greater number of vertically adjusted positions than can be obtained if the notches and teeth are aligned with respect to each other.

In the structure of this invention, both lock plates are mounted to the same seat support bracket, one inboard of the bracket and the other outboard of the bracket. In the preferred embodiment, the outboard lock plate is planar and the edges thereof mount shoes which slidably mount the lock plate between flanges of the seat support bracket. The plate slidably bears against the planar web of the seat support bracket and is connected thereto. Thus the lock plate is effectively trapped against any tilting movement relative to the seat support bracket. The inboard lock plate is also planar and also mounts shoes on the edges thereof. These shoes are received between the flanges of a bracket mounted to the seat support bracket and of the same cross-section thereof. Additionally the shoes of the inboard lock plate are trapped between an auxiliary bracket and the seat support bracket such that the inboard lock plate is also effectively trapped against tilting movement relative to the planar web of the inboard bracket against which it slidably bears. Since the shoes are trapped between the auxiliary bracket and the seat support bracket, no slidable connection is necessary between the lock plate and the auxiliary bracket. This arrangement of the lock plate simplifies the manual release mechanism for selectively moving the lock plates to released position to permit vertical adjustment of the front portion of the seat and the holding of the front portion in the new position by engagement of a notch of one lock plate with a front pivotal connection between the seat support bracket and the vehicle.

The rear portion of the seat is vertically adjusted and held in various vertically adjusted positions by a screwjack mechanism similar to that of the Langmesser and Rees structure. However, the screwjack mechanism of this invention includes a spring clip which has U-shaped leg portions thereof mounted within openings in an internally threaded tube of the screwjack and normally bearing against the threaded outer surface of the screw. In order to fix the upper vertical position of the rear of the seat, the screw is provided with a pair of circumferentially facing shoulders, generally diametrically opposite to each other, and a leadin surface to each shoulder which generally follows a helical path defined by a plurality of threads of the screw. When the screw has moved axially relative to the tube to a position wherein the rear portion of the seat is at the maximum permissible vertical height, the U-shaped legs of the spring clip on the tube engage and ride along the spiral cams until they engage the circumferential shoulders to thereby limit any relative further movement of the screw and the tube and fix the seat in the maximum vertically elevated position.

One feature of this invention is that it provides an improved seat adjuster arrangement for vehicle seats which includes a seat support bracket having a portion thereof mounted to the vehicle by a lever, with a pair of lock plates being mounted on opposite sides of a planar portion of the bracket for sliding movement relative thereto between engaged and disengaged positions relative to the pivotal connection of the lever to the vehicle, with the lock plates being selectively movable between engaged and released positions relative to the pivotal connection to selectively permit vertical adjustment of the portion of the bracket or hold such portion against adjustment. Another feature is that the lock plates have alternating teeth and notches offset with respect to each other laterally of the planar portion of the seat support bracket, with the notch of one lock plate engaging the pivot while a tooth of the other lock plate simultaneously engages the pivot, with both lock plates being simultaneously movable out of engagement with the pivot to permit adjustment of the portion of the seat support bracket. Yet another feature is that a single release member is pivotally and slidably connected to both lock plates to move both lock plates simultaneously to released position but permit both a notch of one lock plate and a tooth of the other lock plate to simultaneously engage the pivotal connection of the lever to the vehicle. Yet another feature is that another portion of the seat is vertically adjusted by a screwjack mechanism which includes radially extending means on one of the members of the screwjack which is resiliently engageable with radially facing shoulders of the other member of the screwjack to provide a limiting stop limiting movement of the members relative to each other and setting a maximum adjustment position of the seat support bracket relative to the vehicle.

These and other features of the invention will be readily apparent from the following specification and drawings wherein.

Figure 1:
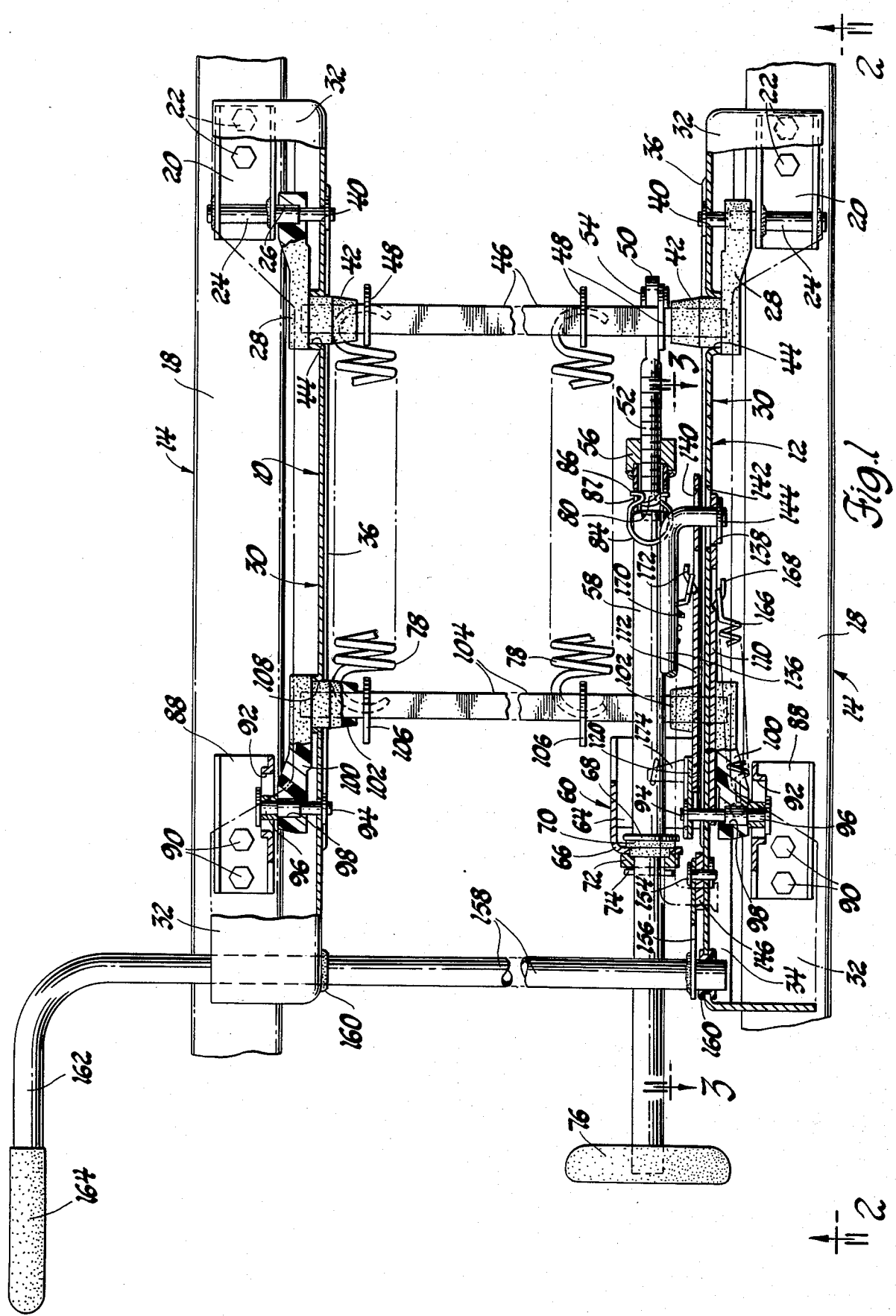
FIG. 1 is a partially broken away top plan view of a vertical seat adjuster arrangement according to this invention.

FIG. 1 shows the inboard and outboard opposite hand seat adjuster mechanisms 10, 12 which provide the adjuster arrangement of this invention. It will be understood the adjuster mechanisms extend longitudinally of a vehicle seat under the outboard and inboard edge portions thereof. Since most of the parts of the mechanisms are common, the same numbers will be used for such common parts.

A conventional horizontal seat adjuster 14 is located inboard of mechanism 10 and outboard of mechanism 12. Each includes a lower track 16, FIGS. 2 and 3, fixedly mounted on the vehicle floor pan, not shown, and an upper track 18 horizontally adjustable relative thereto. The details of the horizontal adjuster 14 are not shown since any one of various known horizontal seat adjusters may be used. Reference may be made to Ser. No. 318,133 filed Nov. 4, 1981, James R. Drouillard, Manually Operated Bucket Seat Adjuster, and assigned to the assignee of this invention for such a known adjuster.

A rear support bracket 20 is secured at 22, FIG. 1, to the upper track 18 of each adjuster 14. The bracket 20 is of channel shape and includes an aligned pair of upwardly extending apertured ears which receive and are welded to a shouldered pin 24, FIG. 1, a portion of which projects inwardly of the outboard bracket 20 and outwardly of the inboard bracket 20. The projecting portion of each pin is received through a shouldered bore 26, FIG. 1, in one end of a rear seat support lever 28 to thereby rotatably mount the levers 28 on the vehicle through the adjusters 14. A seat support bracket 30 extends longitudinally of each adjuster 14 beneath the inboard and outboard edges of the seat. Each bracket includes a continuous laterally extending peripheral flange and has upper front and rear flange portions 32 and lower front and rear flange portions 34. The rear portions 32 overlie brackets 20, FIG. 1, and are conventionally secured to the seat. A linear strenghtening bead 36 is provided at the juncture of the bracket 30 and flange portions 32 and a like bead 38 is provided at the juncture of the bracket 30 and the flange portions 34. The peripheral flange and beads 36 and 38 run between both of the flange portions 32 and 34. Each bracket 30 includes an arcuate closed slot 40 which receives the projecting portion of a respective pin 24.

As shown in FIG. 1, the other end of each lever 28 includes an integral tubular extension 42 which extends through a flanged opening 44 in a respective bracket 30. Each extension includes a generally square cross-section bore which receives the end of a like shaped rear transfer tube 46 which extends transversely underneath the rear of the seat and ties the inboard and outboard rear seat support levers 28 together for conjoint rotation about a respective pin 24 to raise and lower the rear portion of brackets 30 and of the seat. Slots 40 are generated about the axis of openings 44 and tube 46. Three levers 48 each have a square shaped opening in an upper end thereof which receives and is secured to tube 46.

The flattened end 50 of a helically threaded jackscrew 52 is pivotally secured at 54 to the outboard lever 48. The jackscrew 52 is threadedly received through a nut 56 which is counterbored to receive and be secured to the rear end of a tube 58, FIG. 1. A generally U-shaped bracket 60, FIGS. 1, 2 and 6, has upper and lower integral legs 62 and 64 respectively, welded to the upper and lower front flange portions 32 and 34 of the outboard bracket 30. The bracket 60 further includes an integral apertured front leg 66 having a tabbed end secured to the bracket 30. The tube 58 extends through the aperture of the leg 66. A washer 68 is fixed to the tube and backs up a stepped plastic bushing 70 which rotatably mounts the tube 58 in the aperture of leg 66. A recessed bushing 72 extends over the forward end of the bushing 70 and the bushings 70 and 72 are clamped to each other and to the leg 66 by the washer 68 and a pin 74 extending through the tube 58. The tube 58 extends forwardly of the front edge of the vehicle seat and is provided with a handle 76 for manual rotation by a seated occupant.

When the handle 76 is turned to rotate the tube 58 and nut 56, the jackscrew 52 is extended and retracted relative to the tube to rotate the outboard lever 48. This lever conjointly rotates the tube 46 and the inboard and outboard levers 28 about their respective pivots on the projecting portions of the pins 24 to simultaneously raise and lower the rear portions of both brackets 30 as the slots 40 thereof move relative to the projecting portions of the pins 24. Thus, the rear portion of the seat may be raised, as indicated in dash lines in FIG. 2, or lowered. A counterbalance spring 78 hooked to the inboard and intermediate levers 48 assists in the raising of the seat and resists the lowering of the seat.

Figure 7:
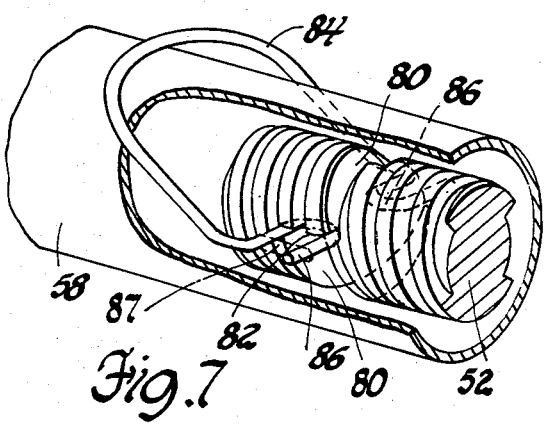
FIG. 7 is an enlarged view of a portion of FIG. 1.

The jackscrew 52, FIG. 7, has a number of adjacent helical threads thereof helically cut away at two circumferentially spaced places to provide a pair of helical cam ramps 80, FIG. 7, each of which terminates in a radial shoulder 82. The shoulders 82 lie in a diametrical plane. A generally U-shaped spring clip 84 straddles tube 58 and has U-shaped terminal legs 86 slidably extending inwardly of the tube through respective axial slots 87. The bights of legs 86 resiliently bear against the threads of the jackscrew 52. When the jackscrew has been extended a predetermined distance from the tube 58 to raise the rear portion of the seat to its maximum limit, the bights of legs 86 will start to engage the helical cam ramps 80 and helically move along these ramps into engagement with the shoulders 82 to provide limit stops as the legs move radially inwardly of slots 87.

A channel shaped front support bracket 88 is secured at 90 to the upper track 18 of each adjuster 14. The inboard leg of the outboard bracket and outboard leg of the inboard bracket include a flanged horizontal slot 92 best shown in FIG. 4. A headed shoulder pin 94 includes a double D portion 96 which is received within the slot 92 to mount a pin 94 to each bracket 88 for horizontal sliding movement relative thereto. Each pin projects from the slotted leg of a respective bracket 88 and is received in a shouldered bore 98 in one end of a respective front seat support lever 100 which is the same as a rear seat support lever 28. Pins 94 thus rotatably mount the levers 100 to the horizontal seat adjuster 14 and to the vehicle. Each lever 100 further includes an integral tubular extension 102 having a square shaped bore which receives one end of a front transfer tube 104 which is the same as the tube 46. Tube 104 ties the inboard and outboard levers 100 to each other for conjoint rotation. Front levers 106, which are the same as the rear levers 48, are mounted on the tube 104 and hooked to the forward ends of the counterbalance springs 78. The extensions 102 of the levers 100 are rotatably received in respective flanged openings 108 of the support bracket 30, FIG. 1.

Figure 2:
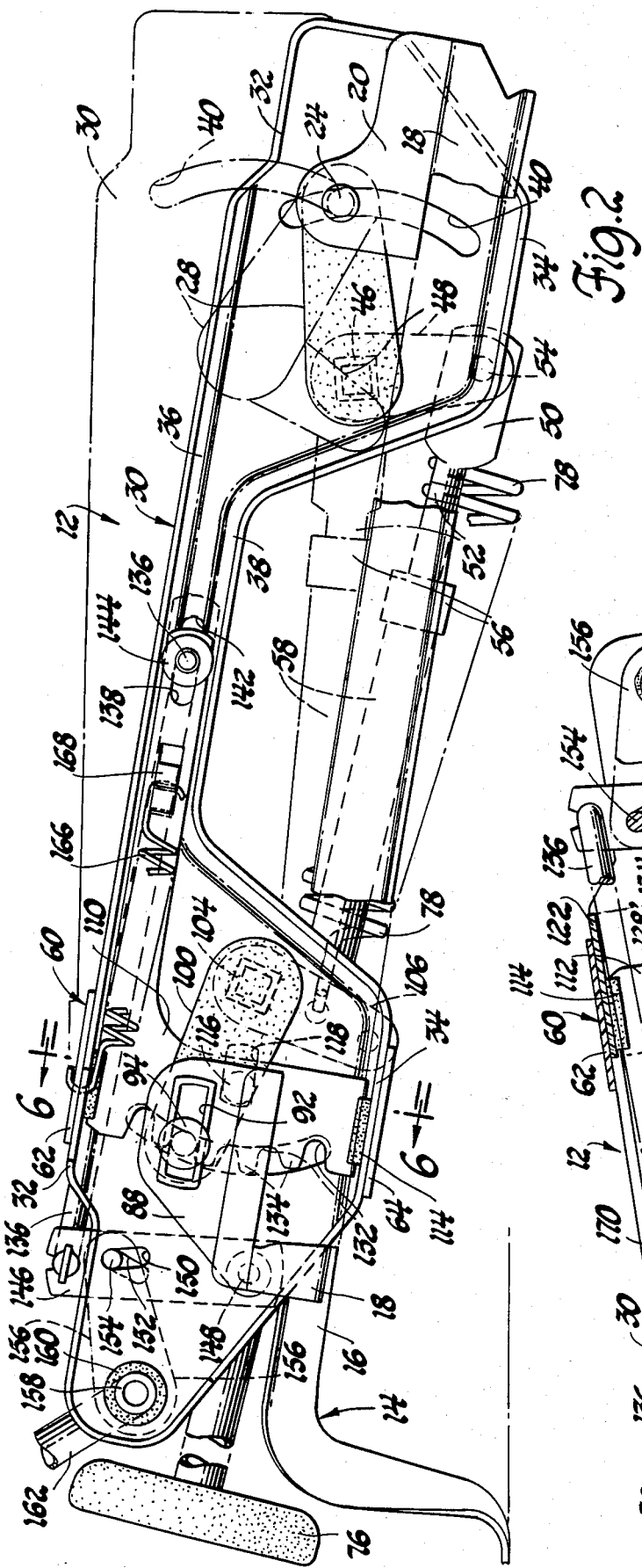
FIG. 2 is an enlarged view taken generally along line 2—2 of FIG. 1.
Figure 4:
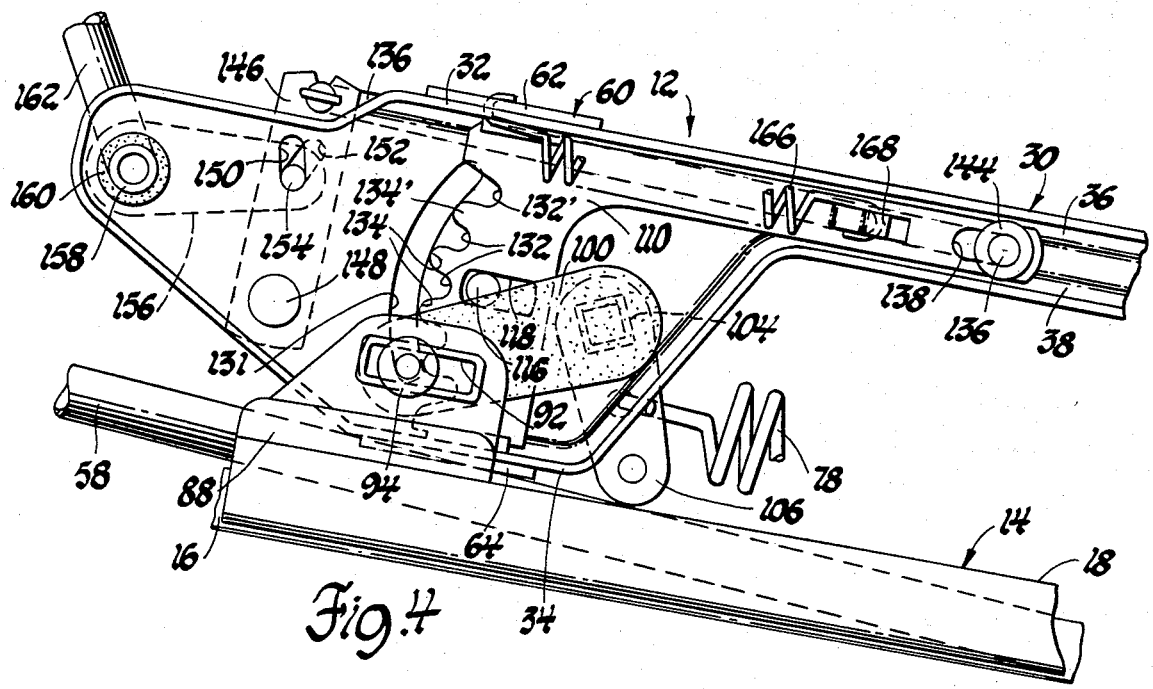
FIG. 4 is a view similar to FIG. 3 but taken outboard of the front portion of the seat in another position thereof.
Figure 5:
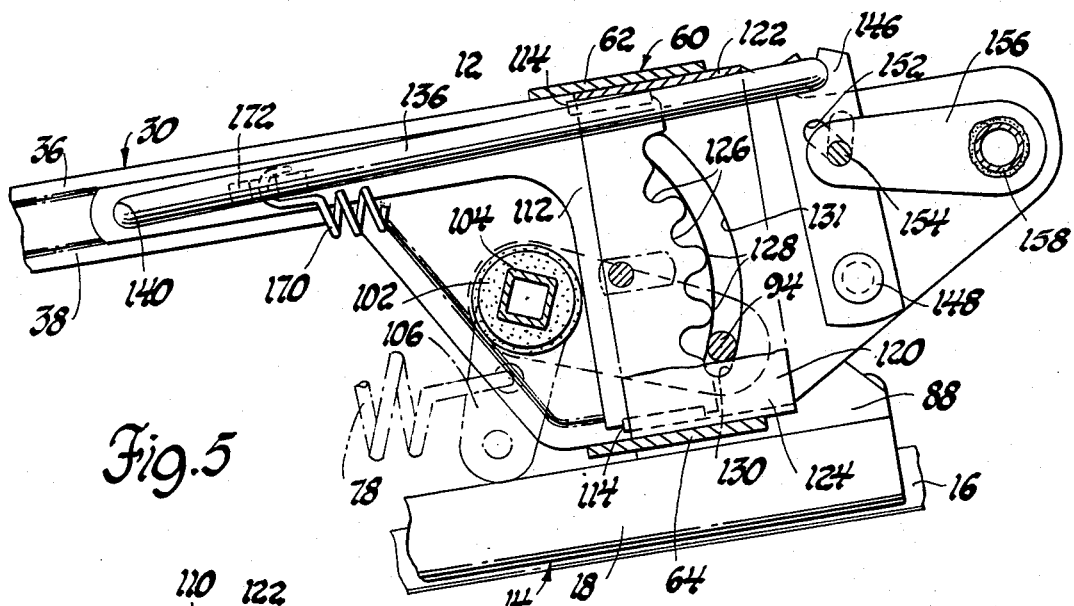
FIG. 5 is the same view as FIG. 4 but taken inboard of the front portion of the seat.
Figure 6:
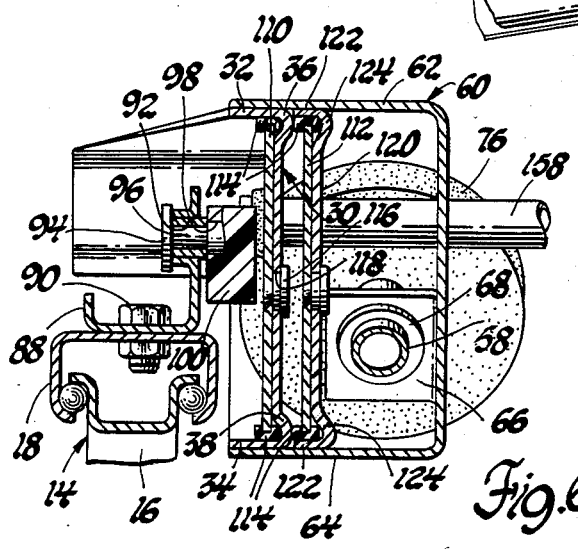
FIG. 6 is an enlarged sectional view along line 6—6 of FIG. 2.

Outboard and inboard lock plates 110 and 112 on the outboard mechanism 12, FIG. 1, mount plastic shoes 114, FIG. 6, on the upper and lower edges thereof. The shoes 114 of plate 110 slidably and non-rotatably mount the lock plate between the front upper and lower flange portions 32 and 34 of each bracket 30, FIG. 6. A headed pin 116, FIGS. 2, 4 and 6, is fixed to the lock plate 110 and slidably moves within an elongated slot 118 in the bracket 30 to guide fore and aft sliding movement of the lock plate 110 between the flange portions 32 and 34 of bracket 30. A generally U-shaped bracket 120, FIG. 6, has upper and lower flange portions 122 thereof welded to the legs 62 and 64 of bracket 60. Shoes 114 slidably bear against flange portions 122. A shown in FIG. 6, the shoes 114 of lock plate 112 are trapped between the beads 36 and 38 of bracket 30 and beads 124 of the bracket 120 to guide fore and aft sliding movement of the lock plate 112. The inboard lock plate 112, FIG. 5, includes a series of four notches 126 separated by teeth or abutments 128 which overlie an arcuate closed slot 130 of the bracket 120. The outboard lock plate 110, FIG. 4, includes a series of five notches 132 separated by teeth or abutments 134 which overlie a slot 131 of bracket 30. The slots 130 and 131 are generated about the axis of tube 104 and are aligned. The end portion of pin 94 projects through aligned slots 130 and 131 and is received either in a notch 126 or 132 and against a tooth 134 or 128 to detent, as will be described.

The offset end of a link 136 extends through elongated openings 138 and 140 in lock plates 110 and 112 respectively and 142 in bracket 30 and a nut 144 is secured thereto opposite the side on which the lock plates 110 and 112 are located. The other offset end of the link 136 is flattened and received in a slot of a lever 146 pivoted at 148 to bracket 30. An arcuate slot 150 in support 30 and an arcuate slot 152 in lever 146 traverse each other and receive a pin 154 fixed to a lever 156. As shown in FIG. 1, the lever 156 is fixed to a tube 158 which is rotatably mounted in bushings 160 in each of the brackets 30. The tube 158 includes an integral lateral extension 162 which is located to the inboard side of the vehicle seat and extends forwardly thereof and mounts a handle 164, FIG. 1, for manual actuation by a seated occupant. A tension spring 166 is hooked between a lanced tab 168 of lock plate 110 and the front flange portion 32 continually bias the lock plate 110 forwardly of bracket 30. Likewise, a tension spring 170 is hooked between a lanced tab 172 of lock plate 112 and a lateral tab 174 of bracket 60, FIG. 1, to continually bias lock plate 112 forwardly of bracket 30. Thus, both lock plates 110 and 112 are biased forwardly or toward pin 94.

Figure 3:
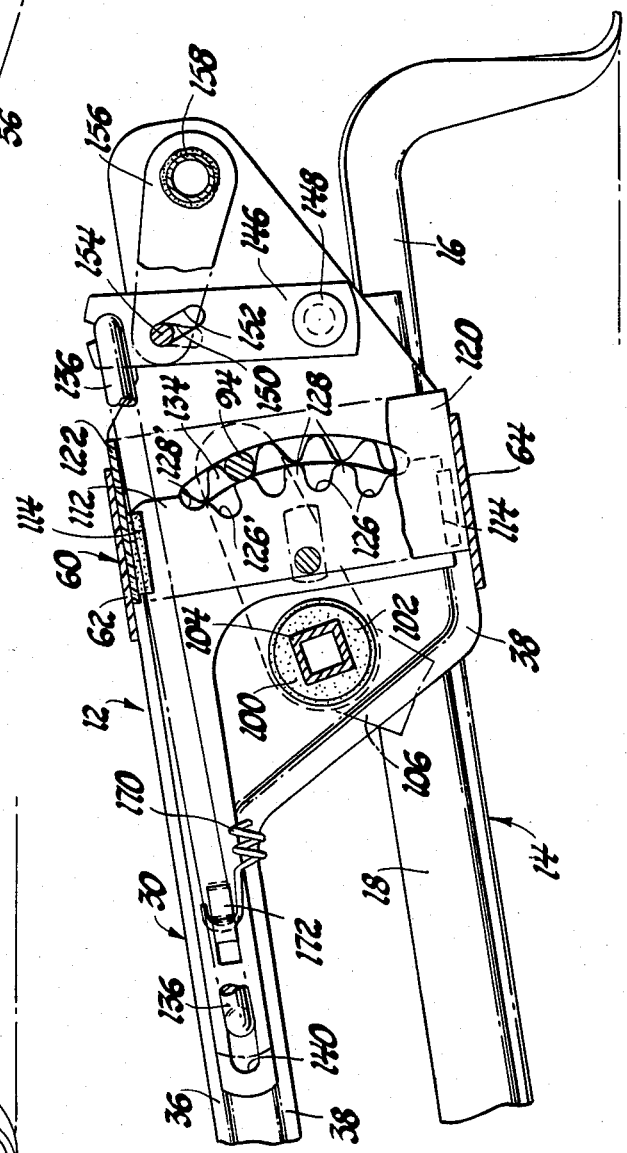
FIG. 3 is an enlarged partial view taken generally along line 3—3 of FIG. 1.

It will be recalled that the inboard lock plate 112 includes four notches 126 separated by teeth 128, FIG. 5, while the outboard lock plate 110 includes five notches 132 separated by teeth 134, FIG. 4. The teeth and notches are formed on an arc having its center at the axis of the transfer tube 104. The notches and teeth of lock plate 112 are offset or are intermediate the notches and teeth of lock plate 110 whereby the notches and teeth of the lock plates are selectively and alternately engageable with pin 94. Thus, the uppermost notch 132' of lock plate 110, FIG. 4, is aligned with the uppermost tooth 128' of lock plate 112, FIG. 3. The uppermost notch 126' of lock plate 112, FIG. 3, is aligned with the uppermost tooth 134' of lock plate 110, FIG. 4. Thus, at each vertical position of the front portion of the seat, only one of the notches 126 or 132 engages pin 94 to lock the seat in such vertical position, while the other of the teeth 128 or 134 engages the pin 94. By locating the notches and teeth offset to each other, the seat can be provided with approximately twice as many vertically adjusted positions as could be provided if the notches and teeth were aligned with respect to each other.

The springs 166 and 170 continually bias the respective lock plates 110 and 112 forwardly, as previously mentioned. When a lock plate has a notch engaging the pin 94, such as the second uppermost notch 132 of lock plate 110 engaging pin 94 as shown in FIG. 2, the rearward end of the slot in such lock plate, such as slot 138 of lock plate 110, engages the rear offset end of link 136 under the bias of a respective lock plate spring, such as spring 166, to shift this link forwardly. This in turn rotates lever 146 counterclockwise about its pivot 148 to locate the pin 154 at the upper ends of slots 150 and 152 and in turn locate the tube 158 and the handle 164 in unactuated position. The other lock plate, lock plate 112, having its tooth, such as tooth 128, engaging the pin 94 under the bias of its spring 170 has the forward end of its slot 140 engaging the rear offset end of link 136. Thus, one lock plate is located in released position when the other is located in engaged position.

If it is desired to vertically adjust the front portion of the seat, the handle 164 is manually grasped and moved rearwardly to rotate the tube 158 clockwise as viewed in FIG. 2. This rotates lever 156 in the same direction. The movement of the pin 154 downwardly of the slot 152 rotates the lever 146 clockwise as viewed in FIG. 2 to shift the link 136 rearwardly. The engagement of the rear offset end of the link with the rearward end of slot 138 moves the lock plate 110 rearwardly to move the notch 132 out of engagement with the pin 94 and release the front portion of the seat for vertical movement. The rear offset end of the link engages the rearward end of the slot 140 at the same time as the notch 132 moves out of engagement with the pin 94. When the seat has been vertically adjusted by the occupant shifting his or her weight to rotate the levers 100 about the pins 94, the handle is released and the springs 166 and 170 thereupon bias the respective lock plates 110 and 112 forwardly to engage a notch of one and a tooth of the other with the pin 94 and again lock the seat in a vertically adjusted position. The front portion of the seat is thus released for vertical movement as the occupant shifts weight to conjointly rotate the levers 100 through tube 104 about their respective pivots to the pins 94 and in turn conjointly raise or lower the front portion of the brackets 30 and the front portion of the seat. When the seat reaches its desired vertical position, the handle 164 is released and the springs 166 and 170 bias their respective lock plates 110 and 112 forwardly of the seat. Depending on the position of the seat, either lock plate 110 or 112 will move to engaged position while the other will remain in released position. Thus, in any vertical adjusted position of the front portion of the seat, one lock plate will always be in locked position while the other will be in a released position, with this alternate location of the lock plates in locked and released positions being permitted by the slots 138 and 140 of the lock plates 110 and 112 and the rear offset end of link 136.

During the vertical movement of the front portion of the seat, the rear portion of the seat pivots about the pins 24 as the pins 94 move in the slots 92. Likewise, during vertical movement of the rear portion of the seat, the seat pivots about the pins 94 as they again move within the slots 92.

Thus this invention provides an improved vertical seat adjuster for selectively manually adjusting the front or rear portion of a vehicle seat.

The embodiments of the invention in which an exclusive property or privilege is claimed are defined as follows:

1. A seat support mechanism for mounting a vehicle seat on a vehicle for vertical adjustment thereof relative to the vehicle comprising, in combination,
   a seat support bracket secured to the seat and including a vertical extending arcuate slot therethrough,
   pivot means fixable relative to the vehicle and extending to opposite sides of the bracket through the slot thereof,
   a lever rotatably secured to the seat support bracket and to the pivot means, rotation of the lever about the pivot means vertically adjusting the seat support bracket,
   a pair of lock plates, each including a plurality of vertically successive detent means spaced by intervening abutment means,
   the detent means and abutment means of one lock plate being vertically offset from those of the other lock plate whereby a detent means of one lock plate is horizontally aligned with a corresponding abutment means of the other lock plate,
   guide means mounting a lock plate on each side of the support bracket for horizontal sliding movement between a locked position wherein one of the detent means engages the pivot means to lock the seat support bracket against movement relative to the pivot means and a released position wherein one of the abutment means engages the pivot means to block engagement of the detent means with the pivot means,
   means biasing both lock plates toward the pivot means to engage a detent means of one lock plate and an abutment means of the other lock plate with the pivot means and thereby locate the one lock plate in locked position and the other lock plate in released position,
   an operator,
   pin and slot means connecting the operator to the lock plates,
   the pin and slot means being engaged between the operator and the one lock plate in locked position and being disengaged and freely slidable between the operator and other lock plate in released position whereby movement of the operator moves the one lock plate from locked position to released position while the other lock plate remains in released position.

2. A seat support mechanism for mounting a vehicle seat on a vehicle for vertical adjustment thereof relative to the vehicle comprising, in combination,
   a seat support bracket secured to the seat and including a vertical extending arcuate slot therethrough,
   a pivot fixable relative to the vehicle and extending to opposite sides of the seat support bracket through the slot,
   a lever rotatably secured to the seat support bracket and to the pivot, rotation of the lever about the pivot vertically adjusting the seat support bracket,
   a pair of elongated lock plates, each including adjacent one end thereof a plurality of vertically successive individual notches spaced by intervening and separated abutments, and an elongated slot adjacent the other end thereof having at least one closed end,
   the notches and abutments of one lock plate being vertically offset from those of the other lock plate whereby each notch of one lock plate vertically corresponds to an abutment of the other lock plate,
   horizontal guide means mounting a lock plate on each side of the support bracket for sliding movement between a locked position wherein one of the notches engages the pivot to lock the seat support bracket against vertical movement relative to the pivot and a released position wherein one of the abutments engages the pivot to block engagement of a notch with the pivot,
   means biasing both lock plates toward the pivot to engage a notch of one lock plate and an abutment of the other lock plate with the pivot and thereby locate the one lock plate in locked position and the other lock plate in released position,
   an operator having a portion thereof received through the slots of both lock plates,
   the operator portion engaging the closed end of the slot of the one lock plate in locked position and being spaced from the closed end of the slot of the other lock plate in released position whereby movement of the operator moves the one lock plate from locked position to released position while the other lock plate remains in released position.

3. A seat support mechanism for mounting a vehicle seat on a vehicle for vertical adjustment thereof relative to the vehicle comprising, in combination,
- a seat support bracket secured to the seat and including a vertical extending arcuate slot therethrough,
- pivot means fixable relative to the vehicle and extending to opposite sides of the bracket through the slot thereof,
- a lever rotatably secured to the seat support bracket and to the pivot means, rotation of the lever about the pivot means vertically adjusting the seat support bracket,
- a pair of lock plates, each including a plurality of vertically successive detent means spaced by intervening abutment means,
- the detent means and abutment means of one lock plate being vertically offset from those of the other lock plate whereby a detent means of one lock plate is horizontal aligned with a corresponding abutment means of the other lock plate,
- guide means mounting a lock plate on each side of the support bracket for horizontal sliding movement between a locked position wherein one of the detent means engages the pivot means to lock the seat support bracket against movement relative to the pivot means and a released position wherein one of the abutment means engages the pivot means to block engagement of the detent means with the pivot means,
- means biasing both lock plates toward the pivot means to engage a detent means of one lock plate and an abutment means of the other lock plate with the pivot means to thereby locate the one lock plate in locked position and the other lock plate in released position,
- and operating means for moving the one lock plate from locked position to released position and for maintaining the other lock plate in released position to permit movement of the bracket slot relative to the pivot means and obtain vertical adjustment of the seat.

* * * * *